United States Patent [19]
Johnson et al.

[11] Patent Number: 5,584,039
[45] Date of Patent: Dec. 10, 1996

[54] SYSTEM FOR COORDINATING EXECUTION OF MULTIPLE CONCURRENT CHANNEL PROGRAMS WITHOUT HOST PROCESSOR INVOLVEMENT USING SUSPEND AND RESUME COMMANDS TO CONTROL DATA TRANSFER BETWEEN I/O DEVICES

[75] Inventors: Francis E. Johnson; Allan S. Meritt; Assaf Marron, all of Poughkeepsie, N.Y.

[73] Assignee: International Business Machines Corporation, Armonk, N.Y.

[21] Appl. No.: 148,795

[22] Filed: Nov. 8, 1993

[51] Int. Cl.[6] ................................................ G06F 13/00
[52] U.S. Cl. ...................... 395/826; 395/821; 395/825; 395/840; 395/872; 395/873; 395/877; 395/879; 364/236.2; 364/DIG. 1
[58] Field of Search ........................... 364/200; 395/400, 395/500, 650, 826, 821, 825, 840, 872, 873, 877, 879

[56] References Cited

U.S. PATENT DOCUMENTS

| | | | |
|---|---|---|---|
| 3,400,371 | 9/1968 | Amdahl et al. | 395/826 |
| 4,040,037 | 8/1977 | Lawlor | 364/200 |
| 4,316,245 | 2/1982 | Luu et al. | 395/650 |
| 4,374,409 | 2/1983 | Bienvenu et al. | 395/650 |
| 4,374,415 | 2/1983 | Cormier et al. | 395/879 |
| 4,394,725 | 7/1983 | Bienvenu et al. | 395/375 |
| 4,471,457 | 9/1984 | Videki, II | 395/834 |
| 4,633,387 | 12/1986 | Hartung et al. | 364/200 |
| 4,635,191 | 1/1987 | Böning | 395/842 |
| 4,811,306 | 3/1989 | Böning et al. | 365/200 |
| 4,837,680 | 6/1989 | Crockett et al. | 395/284 |
| 5,317,739 | 5/1994 | Elko et al. | 395/650 |
| 5,367,661 | 11/1994 | Hough et al. | 395/500 |
| 5,369,750 | 11/1994 | Inoue et al. | 395/400 |

OTHER PUBLICATIONS

"Host I/O Data Management Enhanced by Unique CCW Coding", IBM Technical Disclosure Bulletin, New York, U.S., Sep., 1977, pp. 1509–1512.
"Partial Command Retry", IBM Technical Disclosure Bulletin, New York, U.S., Dec., 1978, p. 3000.
"Post Suspend Resume", IBM Technical Disclosure Bulletin, New York, U.S., Feb., 1981, pp. 4228–4230.
"Semi–Synchronous Cached DASD", IBM Technical Disclosure Bulletin, New York, U.S., Oct., 1985, pp. 1885–1888.
"Interrupt–Free Interprocessor Communications", IBM Technical Disclosure Bulletin, New York, U.S., Jun., 1986, pp. 273–275.
"High Performance Interprocessor Communications", IBM Technical Disclosure Bulletin, New York, U.S., Jun., 1986, pp. 225–226.
"Signal Delivery Protocol", IBM Technical Disclosure Bulletin, New York, U.S., Apr., 1991, pp. 304–305.

*Primary Examiner*—Thomas C. Lee
*Assistant Examiner*—Le Hien Luu
*Attorney, Agent, or Firm*—Bernard M. Goldman; Andrew J. Dillon

[57] ABSTRACT

Coupling execution of channel programs without central processing unit supervision controls data transfer between input/output devices through a main storage of a data processing system. In one embodiment, channel programs to be coupled are generated by a program running on a data processing system central processing unit. The channel program on the input subchannel includes channel commands referencing the output subchannel and operating to cause resumption of the output subchannel. The channel program on the output subchannel includes suspend channel commands directed to itself which correspond to the resume channel commands in the channel program on the input subchannel. In alternative embodiments values in channel commands can change values in, or reference, control blocks to effect execution of other channel programs.

36 Claims, 10 Drawing Sheets

| POINTER TO ACT.ADR. | CF | CF | • | • | • | CF | CF |
|---|---|---|---|---|---|---|---|
| POINTER TO ACT.ADR. | CF | CF | • | • | • | CF | CF |
| POINTER TO ACT.ADR. | CF | CF | • | • | • | CF | CF |
| • | • | • |   | • |   | • | • |
| • | • | • |   | • |   | • | • |
| • | • | • |   | • |   | • | • |
| POINTER TO ACT.ADR. | CF | CF | • | • | • | CF | CF |
| POINTER TO ACT.ADR. | CF | CF | • | • | • | CF | CF |

Subch A  422

Wait for buffer 1 empty
Read (buffer 1)

Set buffer 1 full
Wait for buffer 2 empty
Read (buffer 2)

Set buffer 2 full
Wait for buffer 3 empty
Read (buffer 3)

Set buffer 3 full
Wait for buffer 4 empty
Read (buffer 4)

Set buffer 4 full
•
•
•

Subch B

Wait for buffer 1 full
424

Write (buffer 1)

Set buffer 1 empty
Wait for buffer 2 full
Write (buffer 2)

Set buffer 2 empty
Wait for buffer 3 full
Write (buffer 3)

Set buffer 3 empty
Wait for buffer 4 full
Write (buffer 4)

Set buffer 4 empty
•
•
•

*Fig. 6*

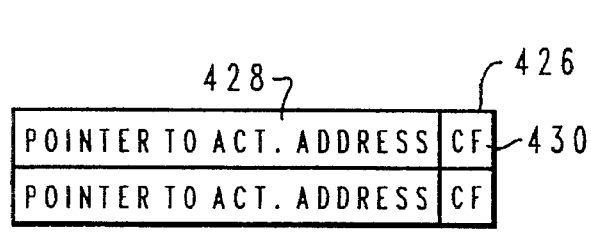

*Fig. 7A*

SYSTEM FOR COORDINATING EXECUTION OF MULTIPLE CONCURRENT CHANNEL PROGRAMS WITHOUT HOST PROCESSOR INVOLVEMENT USING SUSPEND AND RESUME COMMANDS TO CONTROL DATA TRANSFER BETWEEN I/O DEVICES

BACKGROUND OF THE INVENTION

1. Technical Field

The invention relates to use of channel programs for the control of data transfer between input/output devices in a data processing system and more particularly to synchronization of channel programs in a data processing system. The invention relates still more particularly to synchronization of channel programs controlling transfer of data from a source input/output device to main storage and from main storage to a destination input/output device without central processing unit intervention.

2. Description of the Related Art

Contemporary mainframe computer architecture is well exemplified by the ESA/390 system manufactured by International Business Machines Corporation. In the ESA/390 system, and its ancestors, data is entered to the computer from input devices such as telecommunication network interfaces, keyboards, tape drives and disk drives. Data is output by the system to printers, communication networks, visual displays and mass storage devices such as disk drives and tape drives. Collectively the sources and destinations of data are known as input/output (I/O) devices. A detailed description of the features of the ESA/390 system may be found in a handbook entitled "Enterprise Systems Architecture/390 Principles of Operation", First Edition, (IBM Corporation, October 1990).

The terms "input" and "output" refer to the transfer of data between an I/O device and main storage for the computer. Contemporary mainframe computer architecture uses an input operation between the main storage and a source I/O device and a subsequent output operation between the main storage and a destination I/O device to move data between I/O devices. Between input and output the data is stored in main storage. The input and output operations are controlled by separate read and write channel programs.

Some operations, such as back up of records, copying of the contents of a disk drive to tape storage, or distribution of video from an optical disk to a network, do not require the computer central processing unit ("CPU") for modification or operation on the data. In such cases, main storage then serves as a buffer for data being moved or copied from a source I/O device to a destination I/O device. Transfer of the data between the two I/O devices requires an input operation and an output operation.

For a number of reasons, using the central processing unit to handle input and output operations is an inefficient use of CPU processing capability. Dedicated processors and associated facilities have long been used to handle most aspects of I/O operation and to remove these functions from the central processing unit. In the IBM ESA/390, the ESA/370 and 370-XA systems, these facilities are provided by a channel subsystem. I/O devices and their control units attach to the channel subsystem. This arrangement has advantages beyond relieving the CPU of the more time consuming aspects of input and output management. For example, I/O operations are made substantially transparent to programs executing on the CPU. Thus programmers need not concern themselves with features of particular I/O devices. More importantly, the CPU can continue to execute program instructions and operations during an I/O operation.

A channel subsystem includes a plurality of control structures called subchannels. A subchannel provides the logical appearance of an I/O device to a program executing on a CPU. A subchannel provides internal storage of a channel command word (CCW) address, a channel path identifier, a device number, and various status indications among other items. Subchannels respond to instructions from the CPU and support execution of channel command words stored in main storage by the CPU. A channel command word specifies a command to be executed and, for commands initiating certain I/O operations, it designates an area in main storage associated with the operation and the action to be taken whenever transfer to or from the area is completed, among other options.

A channel program is a logical sequence of channel command words which a channel subsystem retrieves in order of the sequence. The sequence is specified by the CPU. The location of the first CCW in a sequence is designated within the operand of a Start Subchannel instruction issued by a CPU to the subchannel and channel subsystem processor.

Notwithstanding the general desirability of removing execution of channel programs from the CPUs, CPU intervention in the execution of the channel programs was provided by the prior art for various purposes. For example, the Suspend function, when used in conjunction with the Resume Subchannel instruction, provides the possibility of stopping and starting a channel program with CPU involvement. In the ESA/390 system, the suspend function is enabled by setting an operand within a Start Subchannel instruction. When during execution of a channel program a suspend flag set in a Channel Command Word is encountered, processing is suspended. The program executing on the CPU may thereafter modify the channel command word which caused the suspension to remove the suspend flag. The CPU may then signal the subchannel with the Resume Subchannel instruction causing reexecution of the same channel command word.

Coupling of subchannels for the transfer of unmodified data from one I/O device to another I/O device has been done by using two subchannels, each separately programmed to handle one aspect of the transfer. One subchannel is programmed to handle the input operation and one channel is programmed to handle the output operation. A CPU coordinates the respective input (read) and output (write) channel programs. As a read channel program executes it completes loading of a block of data from an I/O device into main storage. A suspend flag is then encountered. The channel subsystem executing the input program then issues an I/O interrupt to the CPU. In response to the interrupt, the CPU issues a Start Subchannel instruction to a Write Subchannel programmed to execute the coupled write channel program. This subchannel works with the same area of main storage just used by the Read program. The Write channel program is written to present a suspend flag after the data in the area of storage has been moved. Again an interrupt is issued to the CPU, which modifies the appropriate data areas and issues the appropriate instruction to cause the input operation to resume execution. Execution of the channel programs alternates by repeated issuance of I/O interrupts and resultant CPU generation of I/O instructions until both channel programs are completed.

Where the number of cycles between the channel programs is great, heavy use of the CPU is required to coordinate alternating execution of subchannels. This can be expensive. As demands for handling high-bandwidth environments are presented to a data processing system, such as digital video transmission, the chance for loss of data or transmission delay increases. Voice and video transmission must be isochronous and bandwidth must be guaranteed to avoid distracting jitter upon reproduction. This is very difficult to achieve if CPU involvement in the process is frequently required, due to competition for CPU processing cycles.

SUMMARY OF THE INVENTION

It is an object of the invention to provide an improved system and method for transferring data between input/output devices where main storage is used to buffer the data during transfer.

It is another object of the invention to provide synchronization of input and output operations to and from a data processing system without contemporaneous central processing unit supervision.

The foregoing objects are achieved as is now described. The invention provides a system and method of coupling execution of channel programs utilized for coordinating data transfer between at least two input/output devices through a main storage of a data processing system, substantially without real time central processing unit involvement. A channel program for an input operation on a first subchannel is generated having a resume channel command referencing a second subchannel. A channel program for an output operation on the second subchannel is generated having a suspend channel command. After generation of the channel programs the system central processing unit issues a start instruction to both subchannels. Responsive to the start instruction, execution of the input and output programs is begun by the appropriate subchannel. Responsive to a Suspend Channel command, the output channel program is suspended in anticipation of a completion of a prerequisite activity in a read channel program. Responsive to execution of resume channel command in the first channel program, execution of the output channel program is resumed.

Repeated suspension and resumption of the channel program for an output operation may be done by providing the channel program for the input operation with a plurality of resume channel commands and the channel program for the output operation with a suspend channel command corresponding to each resume channel command referencing the second subchannel in the first channel program. In this environment the step of suspending the channel program for the output operation occurs upon encountering a suspend channel command for which the corresponding resume channel command has not been executed. A "suspend" and "resume" pair can be used to ensure that a given buffer is first read by the read channel program, and only then written out by the write channel program.

In alternative embodiments, the invention provides channel programs in which corresponding segments reference a given buffer area within the main storage. Execution of the corresponding sections in the write channel program is controlled by reference to execution of the read channel program or by reference to a control block indicating buffer area status. If the buffer area has not been filled by a channel command word in the read channel program execution of the write channel program is suspended. Responsive to filling a buffer area by execution of channel command word in the read channel program, resumption of execution of the write channel program is initiated, even if not already suspended.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a timing diagram for a pair of coupled channel programs;

FIG. 6 is a timing diagram for a pair of channel programs coupled in accordance with a second embodiment of the invention;

FIGS. 7A and 7B diagram a status control blocks for coupled channel programs;

DETAILED DESCRIPTION OF THE INVENTION

The coupling of channel programs allows coordinating input and output operations. However, several of the embodiments described here can be applied without substantial change for the coordination of channel programs written for other purposes. For example, if two channel programs must be alternately executed to write to a device or to a set of related devices, they can be coordinated in their activities (regardless of their respective inputs) through use of the suspend and resume mechanisms described here. The references below to READ CHANNEL PROGRAMS and WRITE CHANNEL PROGRAMS is for simplicity in illustration. A channel program may include both read and write operations and be coordinated with another channel program including both types of operation.

Overview of the Channel Subsystem and I/O Operations

Figure 1:
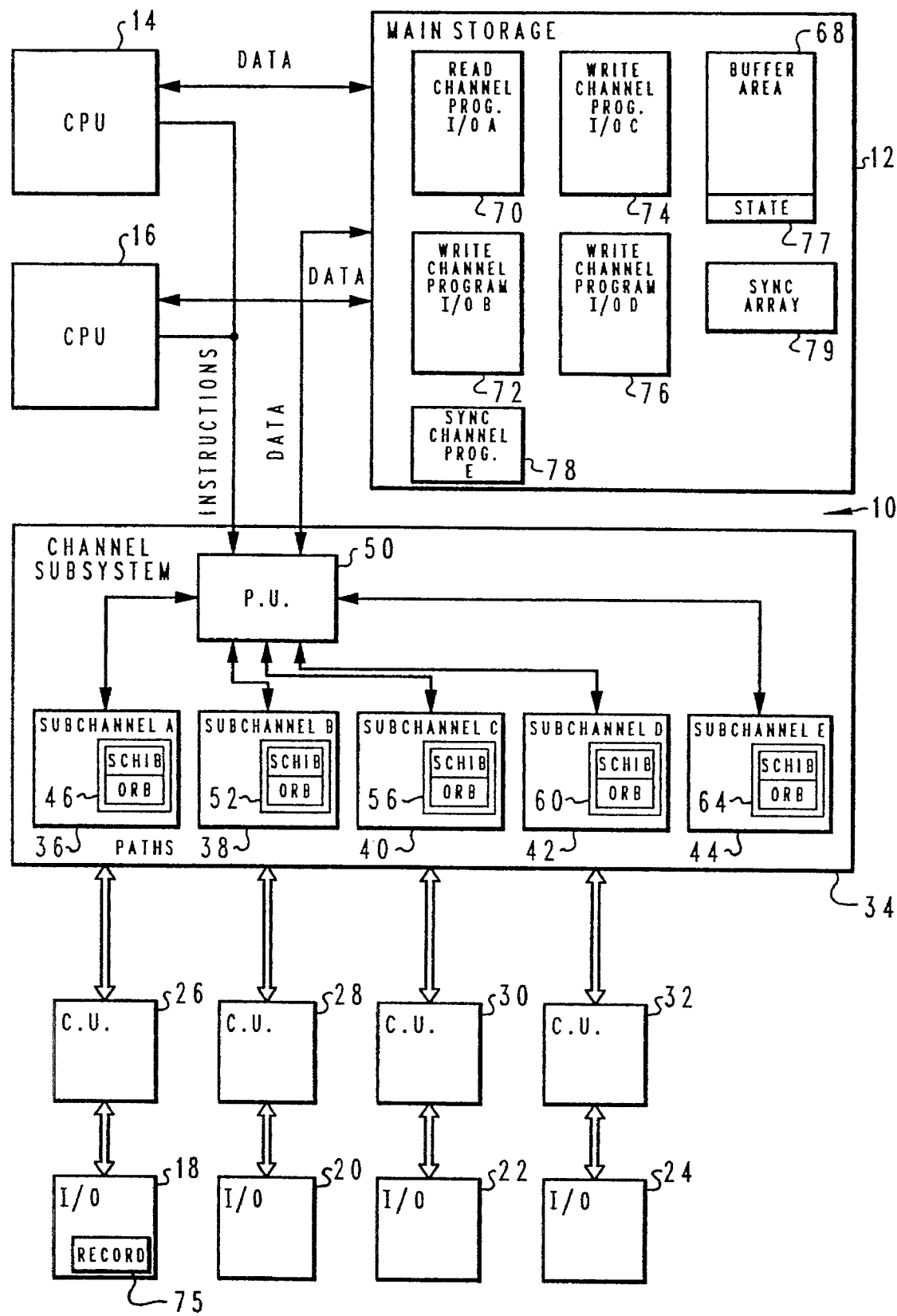
FIG. 1 is a high level block diagram illustrating logical organization of a mainframe computer system.

FIG. 1 illustrates the logical organization of a mainframe computer system 10. System 10 includes a main storage 12 and first and second central processing units 14 and 16. A plurality of input/output (I/O) devices 18, 20, 22 and 24 are attached to host computer 10 through a channel subsystem 34. Control units 26, 28, 30 and 32 provide an interface between I/O devices 18–24 and channel subsystem 34 and logically are considered to be part of the I/O devices. The communication of data between I/O devices and computer system 10, and from one I/O device to another I/O device, is handled by channel subsystem 34. The connection between the channel subsystem 34 and one of control units 26, 28, 30 or 32 for an I/O device is called a channel path. I/O devices 18–24 may be a collection of peripheral devices, such as tape drives, disk drives, display devices, data transmission facilities, et cetera. A particular I/O device may be available for data input, data output, or both types of operation.

Main storage 12, which is directly addressable, supports high speed processing of data by CPUs 14 and 16 and by channel subsystem 34. Both data and programs must be loaded into main storage 12 from I/O devices 18–24 before they can be processed by CPUs 14 and 16. At any instant, channel subsystem 34 and CPUs 14 and 16 have access to the same blocks of storage and refer to particular blocks of main storage locations at the same absolute addresses. Central processing units 14 and 16 are the controlling centers of the system. CPUs 14 and 16 contain the sequencing and processing facilities for instruction execution, interruption action, timing functions, initial program loading and other machine related functions. Instructions which CPUs 14 and 16 execute fall into five classes: general; decimal; floating point; control; and input/output instructions.

Input/output (I/O) operations involve the transfer of information in either direction between main storage and an I/O device. I/O devices 18–24 and their control units 26–32, respectively, are attached to the channel subsystem 34 which controls this data transfer. Channel subsystem 34 directs the flow of information between I/O devices 18–24 and main storage 12. Interposing channel subsystem 34 between CPUs 14 and 16 and I/O devices 18–24 relieves CPUs 14 and 16 of the task of communicating directly with I/O devices and permits data processing and I/O operations to proceed concurrently. Channel subsystem 34 uses one or more channel paths as a communication link in managing the flow of information to or from an I/O device. As part of I/O operations, channel subsystem 34 also performs testing for channel path availability, selecting an available channel path, and initiating execution of the operation with the I/O device. Channel subsystem 34 includes subchannels 36, 38, 40, 42 and 44, which while usually located in channel subsystem 34, may be located in a nonaddressable portion of main storage 12.

One subchannel is provided for and dedicated to each I/O device accessible to a channel subsystem 34. Each subchannel 36–44 contains storage for information concerning the associated I/O device and its attachment to the channel subsystem. A subchannel also provides storage for information concerning I/O operations and other functions involving its associated I/O device. The information is structured as control structures for I/O operations. Control structures stored on a subchannel can be accessed by CPUs 14 and 16 using input/output instructions as well as by processor 50 in channel subsystem 34. To support the control structures, subchannel 36 includes internal storage 46; subchannel 38 includes internal storage 52; subchannel 40 includes internal storage 56; subchannel 42 includes internal storage 60; and subchannel 44 includes internal storage 64. Communications between subchannels 36–44 and main storage 12 or CPUs 14 and 16 occurs over an instruction bus.

Main storage cycles used by channel subsystem 34 do not interfere or delay CPU program execution, except when the CPUs and the channel subsystem attempt to concurrently reference the same area in main storage 12.

A subchannel, such as subchannel 36, provides the logical appearance of a device to a program executing on one of CPUs 14 or 16 and contains in storage 46 the information required for sustaining a single input or output operation. Internal storage 46 contains information providing a channel command word address, a channel path identifier, a device number, count, status indications, input/output interruption subclass codes, path availability, functions pending or being performed, and as taught by the present invention, may include a reference to a subchannel dedicated to execution of a coupled channel program. Coupled channel programs may mutually refer to one another through their respective subchannels.

After an operation with a subchannel has been requested by issuance of a Start Subchannel instruction, the CPU which issued the instruction is released for other work and the channel subsystem assembles or disassembles data and synchronizes the transfer, in either direction, of data bytes between the I/O device and main storage 12. To accomplish this, channel subsystem 34 maintains and updates an address and a count that describe the destination or source of data in main storage. Similarly when an I/O device provides signals that should be brought to the attention of the program, channel subsystem 34 transforms the signals into status information and stores the information in the subchannel where it can be retrieved by the program.

Each subchannel has a system-unique value used to address the subchannel. A subchannel is responsive to seven input/output instructions including a Clear subchannel; a Halt subchannel; Modify subchannel; Resume subchannel; Start subchannel; Store subchannel; and Test subchannel. In the prior art these instructions were issued by a central processing unit.

Figure 2:
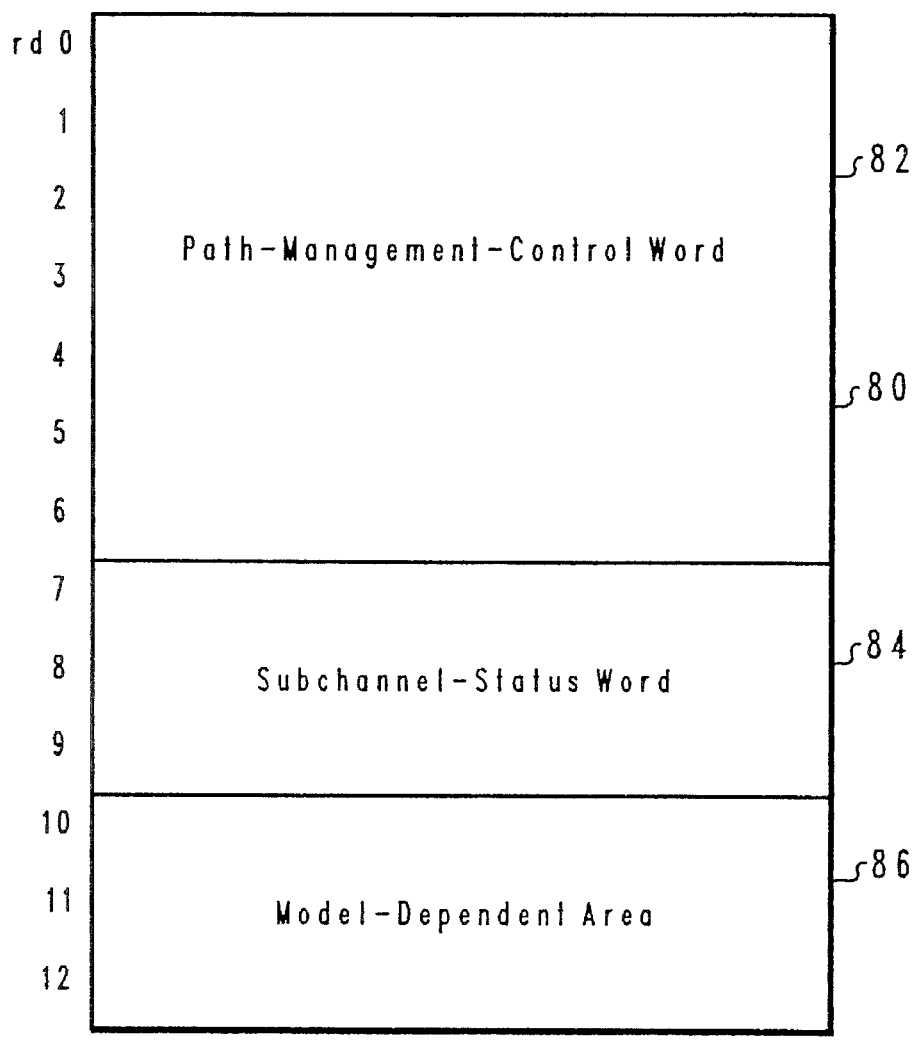
FIG. 2 illustrates a data structure for a subchannel.

FIG. 2 illustrates the structure of a control structure called the subchannel information block (SCHIB) 80. Subchannel information block 80 functions as an operand of the Modify Subchannel and Store Subchannel instructions. The Modify Subchannel instruction of the CPU is described below in greater detail. A subchannel information block 80 is a data structure stored in main storage 12, and contains fields representing the content of the subchannel. A subchannel information block contains three major fields: a path management control word 82; a subchannel status word 84; and a model dependent area 86.

The Store subchannel instruction is used to copy the value for the current path control word 82, subchannel status word 84 and the model dependent data of the designated subchannel 86 into main storage 12. The modify subchannel instruction alters certain path management control word 82 fields. When a CPU program changes the contents of one or more path management control word fields, a Store subchannel instruction is used to obtain the current contents of the subchannel information block. Then a CPU performs required modifications to the path management control word in main storage and executes a Modify Subchannel to pass new information to the subchannel.

Either CPU 14 or 16 can generate and then store channel programs in main storage 12. Here channel programs 70, 72, 74, 76 and 78 correspond to subchannels 36, 38, 40, 42 and 44. Also present in main storage 12, in some embodiments of the invention, is a state indication or status indication 77 referring to the current condition of buffer area 68 and a synchronization array 79 used for coordinating operation of a plurality of subchannels, such as might be used to distribute a record such as record 75 among a plurality of destination input/output devices.

Among the input/output instructions available, those of particular interest are the Modify Subchannel, the Resume Subchannel and the Start Subchannel instructions. The information contained in a SCHIB placed in storage 46 of a subchannel 36 allows a program executing the CPU to change, for that subchannel, certain aspects of I/O operations relative to clear, halt, resume and start functions and certain input/output support functions. Among items placed in the SCHIB are a Resume Subchannel as an instruction to a channel subsystem to perform a resume function or to designate its subchannel. The execution of a channel program can be suspended as a result of encountering a CCW with the suspend bit on, a "suspend" command word, or a "compare and move or suspend" instruction. When execution of a channel program by subchannel subsystem 34 is resumed from a suspended state, an I/O device views the resumption as the beginning of a new chain of commands. Performance of a resume function causes execution of a currently suspended channel program to be resumed with an associated I/O device under certain conditions. Execution is conventionally resumed with the channel command word last executed. With the use of Start Subchannel a channel subsystem is signalled to perform asynchronously the start function for the associated I/O device. Certain execution parameters are associated with the Start Subchannel command and are contained in a designated operation request block which is placed at the designated subchannel storage.

Figure 3:
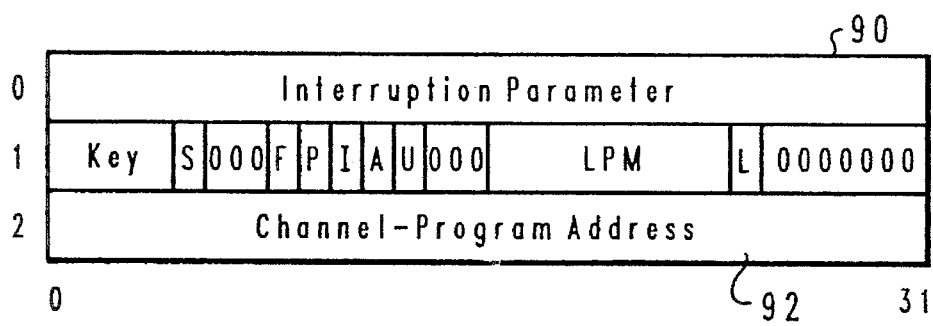
FIG. 3 is an illustration of a data structure for an operation request block.

FIG. 3 illustrates a format for an operation request block (ORB) 90. Among items included with the operation request block are a subchannel key to a buffer area for data being transferred and a channel program address to main storage allowing the channel subsystem to begin execution of the appropriate channel program for the subchannel.

The subchannel key is necessary for fetching of all channel command words and output data or for the storing of input data associated with the start function initiated by start subchannel. The subchannel key is matched with a storage key during these main storage references. Such keys are for the protection of data resident in main storage.

Functions for a channel program are provided by channel command words (CCW). A channel command word specifies a command to be executed and, for commands initiating certain I/O operations, it designates the storage area associated with the operation, the action to be taken whenever transfer to or from the area is completed, and other options. A channel program consists of one or more channel command words that are logically linked such that they are fetched by the channel subsystem and executed in the sequence specified by the program executing on CPU 14 or 16. Contiguous channel command words are linked by the use of the chain data or chain command flags and non-contiguous channel command words may be linked by a channel command word specifying a transfer in channel command. As each channel command word is fetched, it becomes the current channel command word. A RESUME command, issued by a subchannel to another subchannel, is advantageously employed, to make coupled channel programs resume pending. In addition the new use of various prior art data structures to achieve the same results is also taught here.

The location of the first channel command word of a channel program is designated in the operation request block described above. The format of channel command words used is the format 1 type which provides a command code field, a data address field, assorted flags and a count field. On ESA/390 Model computer systems format 1 channel command words can be located in any addressable area. The commands utilized by the invention are effective in format 1 only.

The particular technique selected to coordinate execution of channel programs may depend upon the operating environment. Examples of environments to be considered are real time video and voice data transfer, multiple destination transfers, disk drive to tape back up operations such as used with large data base operations, among other situations.

Channel Program Synchronization through Modification of the Resume/Suspend Mechanism One embodiment of the invention is based upon modification of the Resume and Suspend subchannel I/O instructions available to a CPU. I/O instructions are functions issued by a CPU to a channel subsystem to be performed by the channel subsystem. Channel command words (CCWs) have typically specified data channel operations and have not been interpreted by the channel subsystem. This embodiment provides a Resume CCW and a Suspend CCW, which like the transfer-in-channel command of the prior art, are interpreted by the channel subsystem.

Figures 4, 7B:
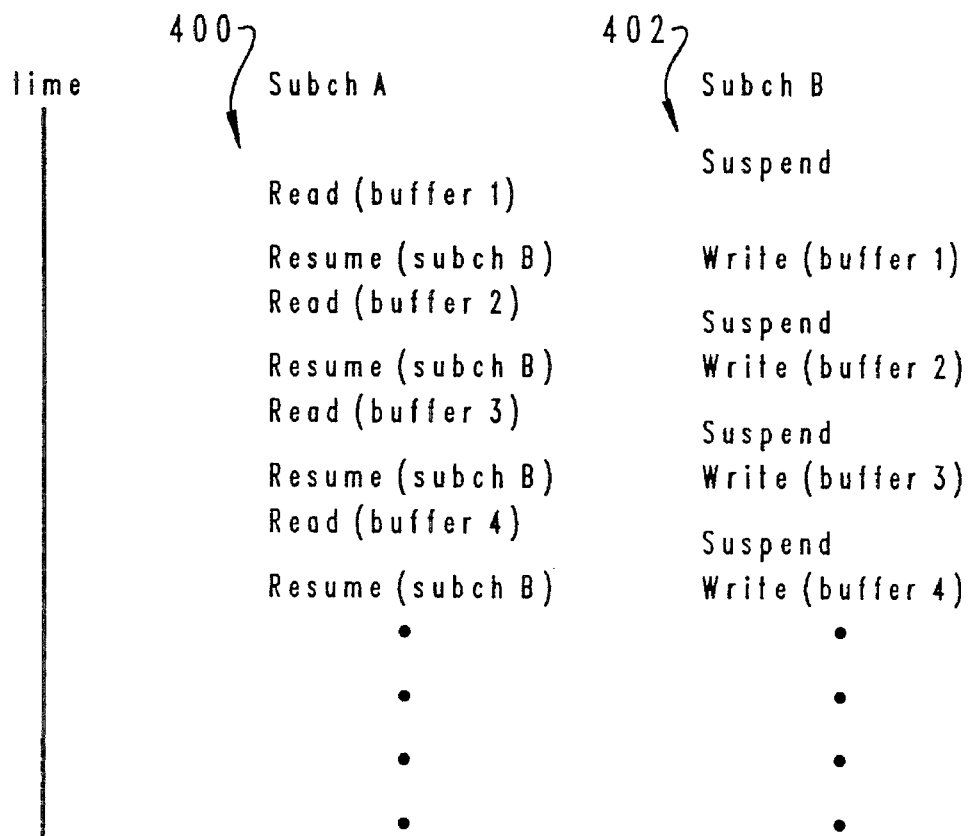

FIG. 4 illustrates a timing relationship of two channel programs for controlling I/O operations, respectively. Execution of the channel programs have been coupled without real time central processing unit involvement by use of instances of the Resume CCW and Suspend CCW in the channel programs. Execution of the channel programs is coordinated by channel subsystem processor 50 upon execution of the new channel command words placed and by associated data structures.

Channel programs 400 and 402 for subchannel A and subchannel B, respectively, are shown against a time line, with time advancing in the downward direction. Channel program 400 is a read program which controls transfer of data from an I/O device into a buffer in main storage. Channel program 402 is a write program, i.e. it transfers data from a buffer in main storage to an I/O device. Program 400 must fill a given buffer with data before program 402 can move the data to an I/O device. In program 400, instances of the Resume CCW conclude each read operation filling a buffer. The Resume CCWs are directed to the channel program associated with subchannel B on which he write program 402 executes. Write channel program 402 includes a instance of the suspend command word preceding each write of a buffer.

In the prior art a suspension/resumption mechanism was provided by specifying a suspend bit in the CCW and by the CPU executing a "RESUME SUBCHANNEL" instruction. For example, a CCW containing a "suspend" bit is encountered by the channel subsystem, then the channel program (i.e. the subchannel)is suspended. When a program causes the execution of the "RESUME SUBCHANNEL" instruction specifying a target subchannel, the target subchannel is resumed if found in a suspended state. The program which issues the RESUME SUBCHANNEL instruction also turns off the "suspend bit" in the CCW in the suspended channel program so that reexecution of that CCW will proceed and not be suspended. When the execution of a channel program on a subchannel is resumed, the CCW which contained the suspend bit is fetched and reexecuted.

The present invention provides a facility for the channel subsystem to initiate a resumption of a subchannel without supervision by the CPU, as well as the ability to manage multiple pending resumptions in a way that eliminates the need to modify the CCWs in the suspended channel program.

Each Resume channel command word in program 400 has subchannel B as an operand. However, complete synchronization of execution of channel programs 400 and 402 is not required. For example, it is not required that program 400 wait on program 402 to reach its first suspend before beginning processing. Upon execution of a resume subchannel command word in program 400, channel program 402 is made resume pending even if subchannel B has not received a start subchannel input/output instruction from a CPU. The Start subchannel (SSCH) input/output instruction is a signal to the channel subsystem from a CPU to asynchronously perform the start function for an associated device. As modified for use with the first embodiment of the present invention, the Start subchannel input/output instruction must both make the subchannel start-pending and leave the subchannel resume-pending.

The channel subsystem monitors execution of two coupled channel programs to avoid having the write channel program 402 overrun the readchannel program 400 by attempting to write out a buffer in main storage which has not yet been filled by the read channel program. For each subchannel, the channel subsystem maintains a Resume count comparing the number of suspends and resumes which are executed by a pair of coupled channel programs. CPU intervention is required only to initiate and to handle early termination of either channel program due to error. In order to handle error conditions, the CLEAR Subchannel I/O instruction has been modified to reset the value of Count to zero when invoked. The progress of each of the coupled channel programs is tracked to allow for recovery and restart of each operation at the appropriate places in the programs. Upon a restart, data which has already been read can be written without requiring suspend/resume coordination in the recovery channel programs, since coordination is done only to ensure data is present before it is written.

Figure 5:
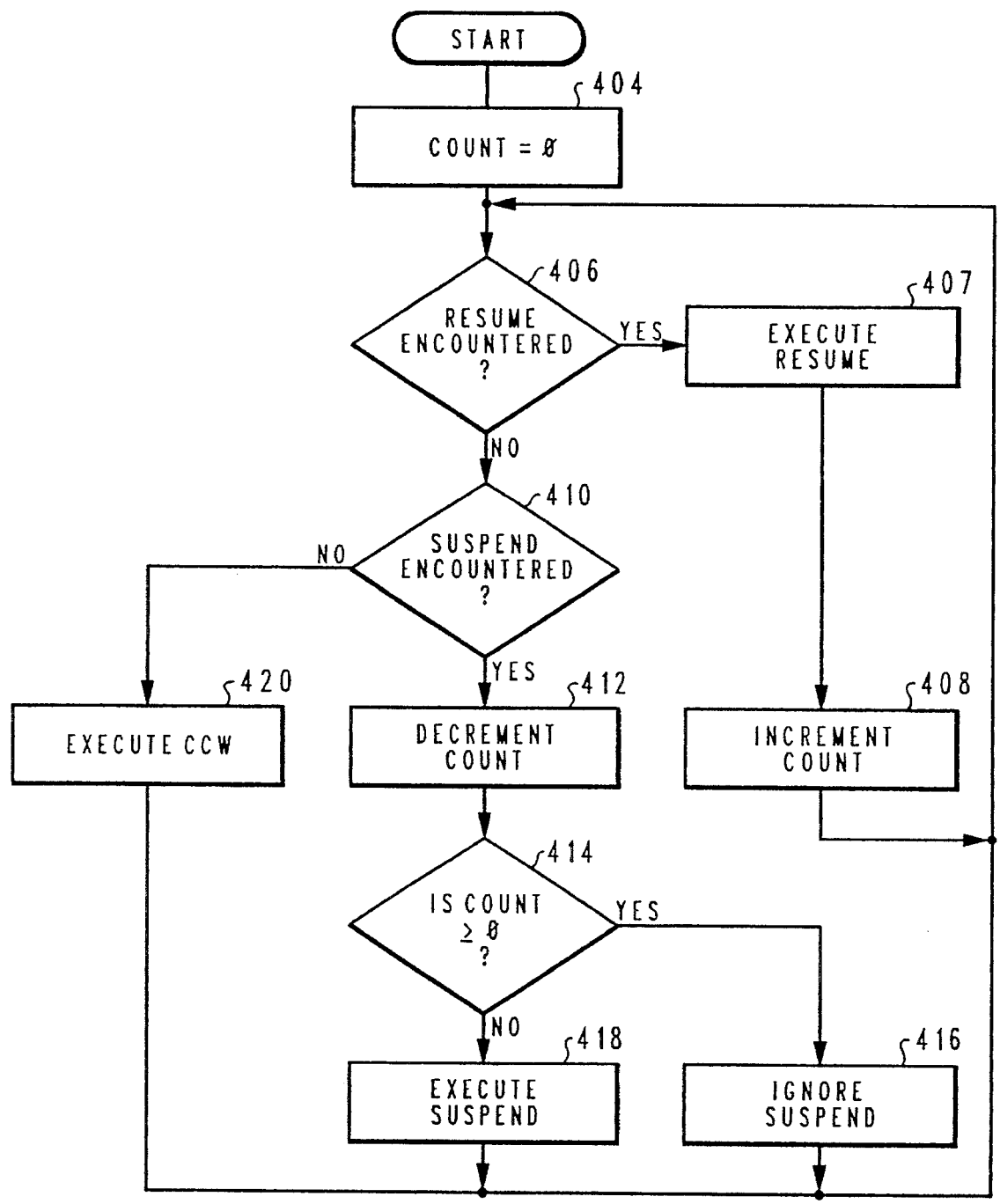
FIG. 5 is a flow chart of a logical process for carrying out one embodiment of the invention.

FIG. 5 is a flow chart of the count process maintained by channel subsystem 34 of the number of outstanding resumes. The Count of Resumes cannot be allowed to fall below zero, because each Resume CCW corresponds to a "Suspend CCW" through a segment of data to be moved. The mechanism to achieve this comparison involves keeping a Count of the difference in number of "Resume CCW" and "Suspend CCW's" executed.

The process is entered at step 404 with initialization of a variable "Count" to a value of zero. Next, with step 406, it is determined if a "Resume" has been encountered. If yes, step 407 reflects execution of the Resume command. Next, step 408 is executed to increment the Count of resumes and processing is returned to step 406 for processing of the next channel command word to become current. If at step 406 a Resume CCW has not been just processed, it is determined at step 410 if the current channel command word is a Suspend CCW. If a Suspend CCW has become current, the value of Count is decremented by execution of step 412. The value of Count is then compared to 0, and if Count is at least 0, the Suspend CCW is ignored (step 416) and processing of the channel program is continued at the point where the Suspend CCW appeared. Processing is returned to step 406 for examination of the next channel command word of either channel program to become current. If Count is negative, the Suspend CCW is executed (step 418) and the process in which the Suspend CCW occurs becomes suspended until a Resume CCW is encountered in a coupled channel program.

Not all channel command words are resumes and suspends. Other channel command words fall through the NO branches of steps 406 and 410 to step 420, which indicates regular execution of the channel command word. After completion of step 420 processing returns to step 406, or if both channel programs have completed, processing ceases.

One read channel program may be coupled with each of a plurality of write programs by the inclusion of a Resume CCW for each coupled write program.

Channel Program Synchronization Through Use of CCWs to Interrogate and Modify a Buffer Status Control Block FIG. 6 illustrates coupling of channel programs 422 and 424 by mutual reference to the status of data transfer buffers. In coupled channel programs 422 and 424, channel command words are used to interrogate and to modify status values in control blocks which represent the status of each of a plurality of buffers used by the coupled channel programs. Execution of programs 422 and 424 is controlled by reference to the control block status. Separate command codes are used for a Wait operation (until a buffer is full or empty) and Set operation (for changing the value in a control buffer from full to empty, or empty to full). FIG. 7A illustrates a control block 426 used to control the coupled subchannel programs 422 and 424. A channel control word points into control block 426, which comprises a pointer field 428 and a control field 430. The pointer field 428 is to the actual address for the buffer (Indirect Data-Address list address). The value of control field 430 is set by the Set commands (to empty or full, the value being an operand of the command) and interrogated by the Wait channel commands. The value of control field 430 may also be set by a program executing on the CPU, which may, for example, initialize all buffers as empty.

By use of a transfer in channel command the channel programs can be permitted to loop, permitting the reuse of buffers without CPU intervention. In effect, an open pipe is made between two I/O devices. With reuse of buffers, the number of buffers used is independent of the total amount of data to be transferred. The number of buffers used for a transfer may be based upon the difference in speeds between the devices or by other considerations.

The control block can be further modified to permit a plurality of I/O devices used for input operations to share buffers with a single I/O device used for output operations. A third state of the control field 430 is then used, such as a "filling" or an "in use" status that prevents two input dedicated I/O devices from simultaneously using the same buffer. An I/O device which attempts use of a buffer which is "in use" waits until the value of control field returns to "empty."

Further generalization of the control block for a plurality of input devices and a plurality of buffers is illustrated in FIG. 7B where m rows of pointers relate to n columns of status indications.

The methods just described allow initiation of two coupled channel programs to completely overlap. This reduces total time required for transfer of data from a source I/O device to a target I/O device, particularly for large transfers of data spanning multiple disk blocks and requiring multiple read and write commands in the respective channel programs for handling the read and write operations. A good example of such situations is continuous video reproduction.

The benefits of the above methods are less apparent, though still present, for transfers of smaller blocks of data. Where the data to be transferred is entirely located in a single disk block, a "double hop" effect remains present. This occurs where write operations lag behind read operations by at least one block. On the ESA/390 system, access to disk drives is by relatively large blocks of data (e.g. 64 Kbytes). Where only one read and one write operation are required, the write channel program must await completion of the read channel program before beginning execution. The total time for completion of the I/O operations includes at least two periods for transfer of a full block of data. The target device sees a virtual connection time from the source disk drive which is no better than half as fast as it could be if the target device had a direct connection to the source device.

Improved Granularity in Transfer by Use of Read Complete Indication in Indirect Data Address Word Improving granularity in transfer of data is particularly beneficial in performance terms where the quantity of data to be transferred is relatively small. The technique described here also has application to writing out data generated by a program relating to animation or visualization of complex processes. As such a program fills in buffers, it can also set the "Read Complete" bit (described below) for controlling progress of execution of a channel program and thus provide a modified channel program to provide for the continuous, real time flow of data to a display device and network interface. Granularity of suspension and resumption may be used to allow overlap of the read and the write operations, particularly where only a single block of data on a disk drive is accessed during the read operation. The ESA/390 system provides a channel command word indirect data addressing (IDA) facility which permits a single channel command word to control the transfer of data that spans noncontiguous pages in main storage 12 and which is exploited here to provide fine granularity.

Figure 8:
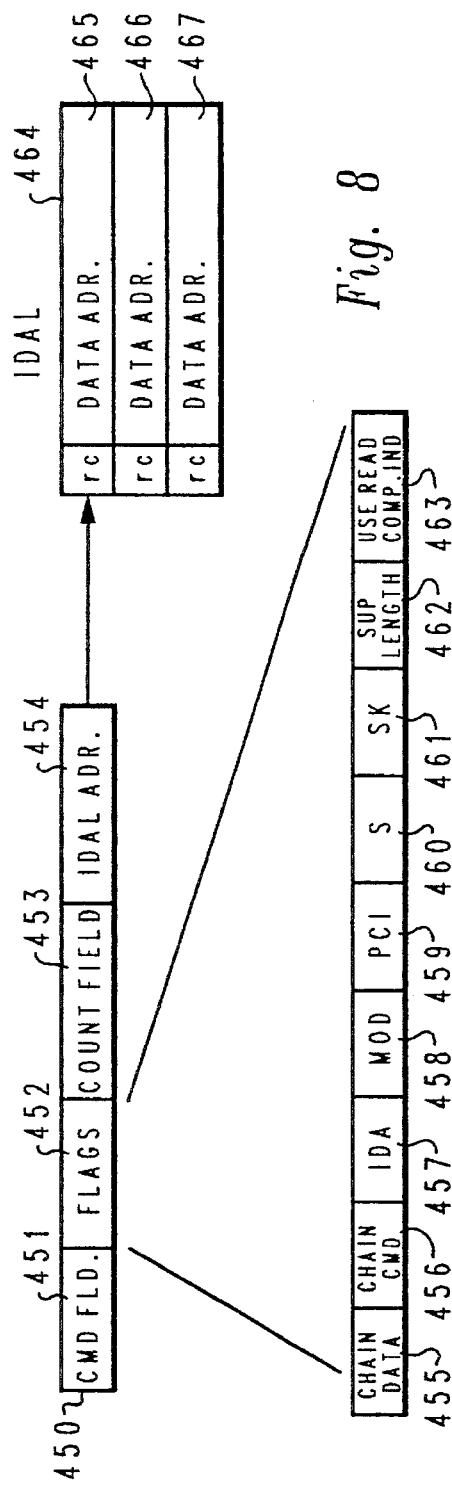
FIG. 8 illustrates a channel command word and related indirect data address list.

FIG. 8 illustrates a representative channel command word 450 and its relationship to an indirect data address list (IDAL) 464. Channel command word 450 is divided into four principal fields including a command field 451 used to specify an operation, a flags field 452, a count field 453 and an address field 454. The flags field is further divided into locations for a chain data flag 455, a chain command field flag 456, an indirect data address field flag 457, a modification field flag 458, a program controlled interruption field flag 459, a suspend flag 460, a skip flag 461, a suppress length flag 462 and a use read complete indicator flag 463. The use of indirect data addressing is specified by indirect data address field flag 457 which, when one, indicates that the data address appearing in the address field 454 of the channel command word is not used to directly address data. Instead the data address in address field 454 points to an indirect data address list 464 of indirect data address words (IDAW) 465, 466 and 467.

Each IDAW, except the first and last of a list, must contain an absolute address designating a data within a 2 Kilobyte block of main storage 12, though this limitation may be overcome by pointing to IDAWs from data chained channel command words. By introducing suspension and resumption between IDAWs, resolution of the operation is improved to the equivalent of 1 to 2 lines of disk drive controller cache.

Suspension of a write program between IDAW referenced blocks is effected by modification of the IDAW and by setting in Flag field 452 of the use read complete indicator (URCI) 463 flag. The modification of the indirect data address words 465-7 provides a "Read Complete" (rc) bit. Cooperation between these elements is illustrated in FIG. 9.

Figure 9:
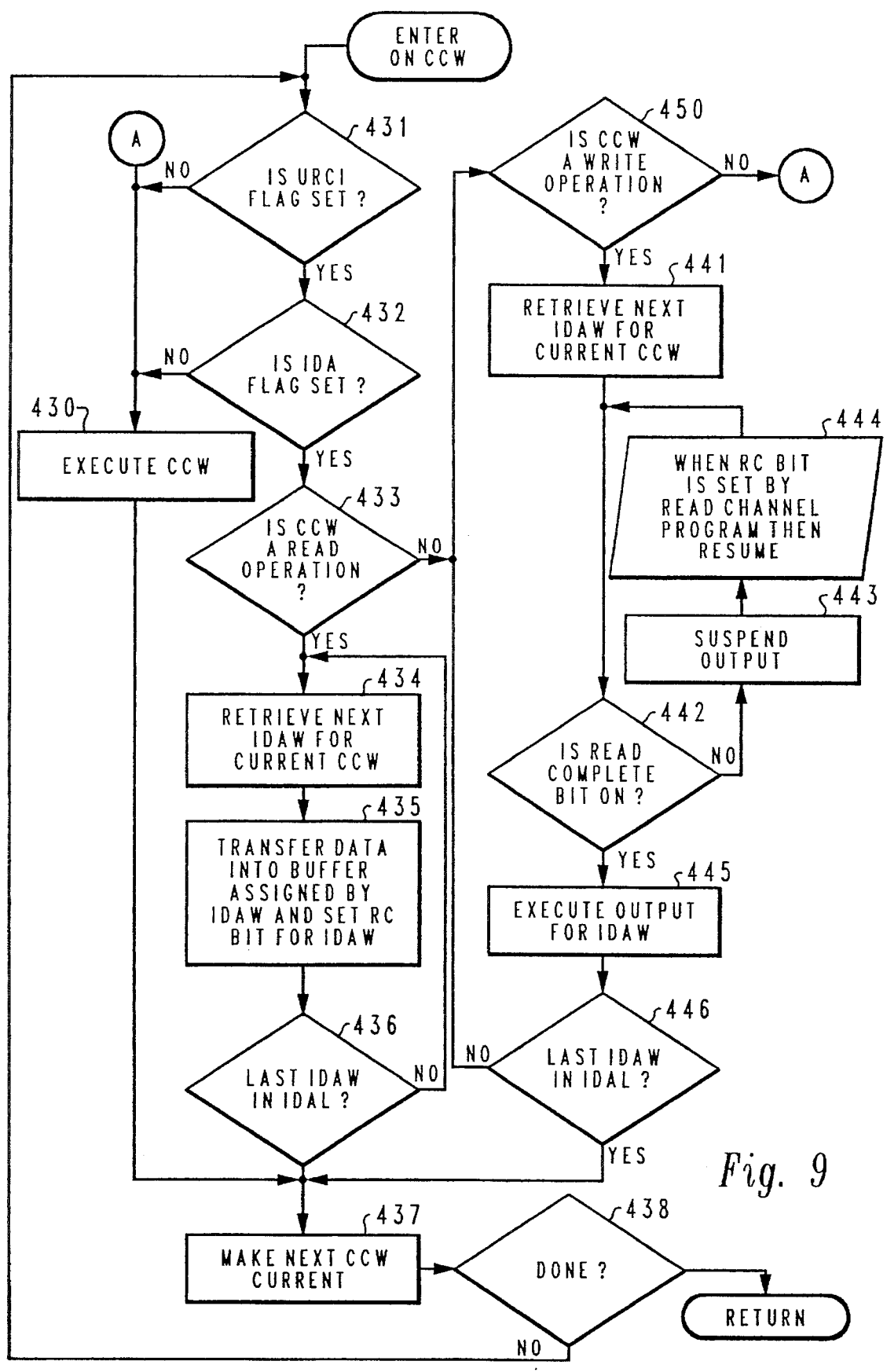
FIG. 9 is a logical flow chart illustrating a process for coordinating execution of channel programs where indirect data address lists are utilized as in one embodiment of the invention.

The process of FIG. 9 is entered with execution of each channel command word as it becomes current for either a read or a write channel program. At step 431 the URCI flag is checked for the current channel command word. If the URCI flag 463 is set, step 432 is executed to determine if the indirect data address flag 457 is also set specifying that indirect data addressing is in use. If the result of step 432 is affirmative, step 433 is executed to determine if the channel command word is for a read or for a write. If it is for a read operation, step 434 is done to retrieve the next IDAW for the current channel command word. Next, step 435 provides for transfer of data into the buffer at the location designated by the IDAW, and setting the read complete bit for the IDAW to full. Step 436 provides looping control through all of indirect data address list 464 by providing a route back to step 434. If the last word in the list has been executed, step 437 is executed to make the next channel command word current. Step 438 provides for looping control through the channel command words of a channel program by providing a path back to step 431 for incomplete programs. The process terminates with exhaustion of the program along the NO branch.

For channel command words where either the URCI or IDA flags are not set, branches from step 431 and 432 jump the program to step 430 which provides for execution of the CCW. After execution of the CCW processing continues at step 437 as described above.

Where the result a step 433 was negative, the CCW is tested (step 450) to determine if it is a write operation. If the CCW is not a write operation execution continues with step 430. If the CCW is a write operation, step 441 is executed to retrieve the next IDAW for the current write channel command word. At step 442 the rc bit in the IDAW is interrogated to determine if the buffer referenced by the IDAW has been filled. If not, step 443 is executed to suspend execution of the channel program. The program remains in this state until a Read Complete bit is set by the coupled read program, which provides reentry to the write channel program and continuation of the process from step 444.

Processing resumes at step 442 with reexamination of the read complete bit in the current IDAW. With the rc bit now on, processing follows the YES branch to step 445 and execution of the channel command for the buffer referenced by the current IDAW. Step 446 provides looping control through all IDAWs in an indirect data address list by providing a path back to step 441. Once all words in an indirect data address list have been executed, processing continues with step 437 as previously described.

Improved Granularity in Transfer by Allowing Suspension and Resumption Within Data Chaining Another way of achieving the same result as the processes set forth in connection with FIG. 9 uses the resume/suspend mechanism described above with reference to FIG. 4 and a data-chaining mechanism provided by the ESA/390 computer and other computers. When channel subsystem 34 has completed the transfer of information specified by a channel command word, the subsystem fetches a subsequent channel command word. This is referred to as chaining and the words are said to be chained. Normally chaining is between successive doubleword locations in main storage proceeding in ascending order of absolute addresses. The so called "transfer-in-channel" command couples chains or words in noncontiguous locations. Chaining is controlled by the "chain-data" (CD), "chain-command" (CC) and "suppress-length-indication" (SLI) flags. Chaining is propagated through the transfer-in channel command, the resume channel command and the suspend channel command.

As suggested by the CC and CD flags, two types of chaining are available. Command chaining is used to generate a channel program from a sequence of channel command words. Data chaining is the type of chaining of interest here. During data chaining, each new channel command word (excepting the Transfer-In-Channel, Suspend and Resume channel command words) defines a new storage area in main storage 12 for the original input/output operation of the chain. The contents of the command code fields in the successive channel command words are ignored, again excepting the Transfer-In-Channel, Resume and Suspend CCWs. The resume and suspend commands work in exactly the same manner as previously described, except now greater granularity is achieved.

Channel Program Synchronization by Use of Compare and Move or Suspend CCW and Move and Resume Coupled Subchannel CCW In this embodiment, synchronization is achieved by defining two completely new channel command words to be executed by the channel subsystem. Where realized in the IBM ESA/390 mainframe computer architecture, the use of CCWs in format 1 is assumed, rather than one of the other available formats.

One of the new channel command words employed is a "Compare and Move or Suspend" channel command word, which provides comparison of a value at a designated absolute storage address with an operand from the channel command word. If the values are equal, the value at the designated absolute storage addressed is replaced by a second operand from the channel command word and the next channel command word becomes current. If the values are not equal, the channel program is suspended. The data used for the comparison and for the subsequent store do not come from an I/O device but rather from the channel command word itself. The count field of the channel command word is used to hold the comparison and replacement values for the operation with bits 16–23 of a format 1 channel command word holding the comparison value and bits 24–31 holding the replacement value. The comparison and the store of the replacement value are done as an interlocked update, so that no other channel, subchannel or central processing unit can change any affected values between the comparison and the store.

The second new command is a "Move and Resume Coupled Subchannel" channel command word. The Move and Resume Coupled Subchannel CCW stores a byte from the channel command word at a designated absolute storage location and then causes any subchannel coupled to the current subchannel to become resume pending, if the resume function is applicable to the subchannel. Again the data used for this store do not come from an I/O device but rather from a channel command word itself. Again the count field of the channel command word is used to store the value.

Figure 13A:
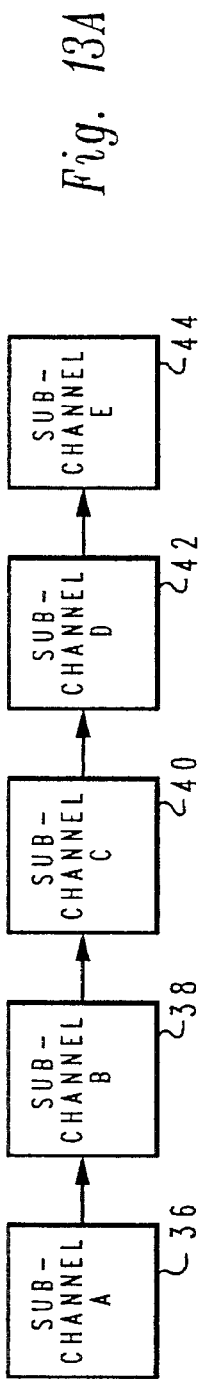
FIG. 13a and 13b are block diagrams illustrating linkage of group of subchannels.
Figure 13B:
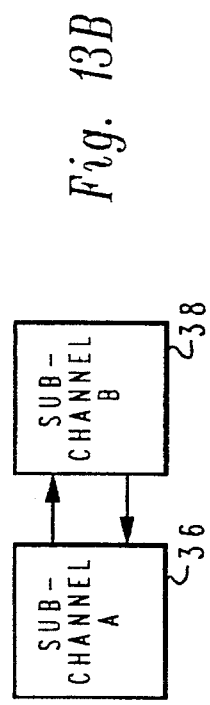

The channel subsystem 34 uses a coupled subchannel field from the subchannels to identify those subchannels, if any, to be resumed. An example of a typical coupled pair of programs includes a read subchannel program coupled to a write subchannel program as illustrated in FIG. 13b where subchannel A 36 is so linked with subchannel B 38. An example of coupling in a sequential link is illustrated in FIG. 13a where subchannel A 36 is linked to subchannel B 38, subchannel B 38 to subchannel C 40, subchannel C 40 to subchannel D 42 and subchannel D 42 to subchannel E 44. When encountering the move and resume coupled subchannel command, the channel subsystem 34 causes each applicable subchannel in the coupling chain to become resume pending until the chain is either broken or returns to the subchannel at which the move and resume coupled subchannel command is current.

Where a plurality of channel programs work consecutively with a buffer area 68 in main storage 12, buffer management must be provided to ensure coherence of the data in the buffer area. Where data buffer 68 is in use by a pair of coupled channel programs, it can assume one of four states: (State 1) the buffer contains no new data and is not in use; (State 2) the buffer is in use by a read channel program; (State 3) the buffer contains new data to be written out; (State 4) the buffer is in use by a write channel program. The normal transition of status for such a buffer is from state 1 to 2, 2 to 3, 3 to 4, and 4 to 1, although to allow for error recovery a channel program may be restarted with the buffer in any state.

Figure 10:
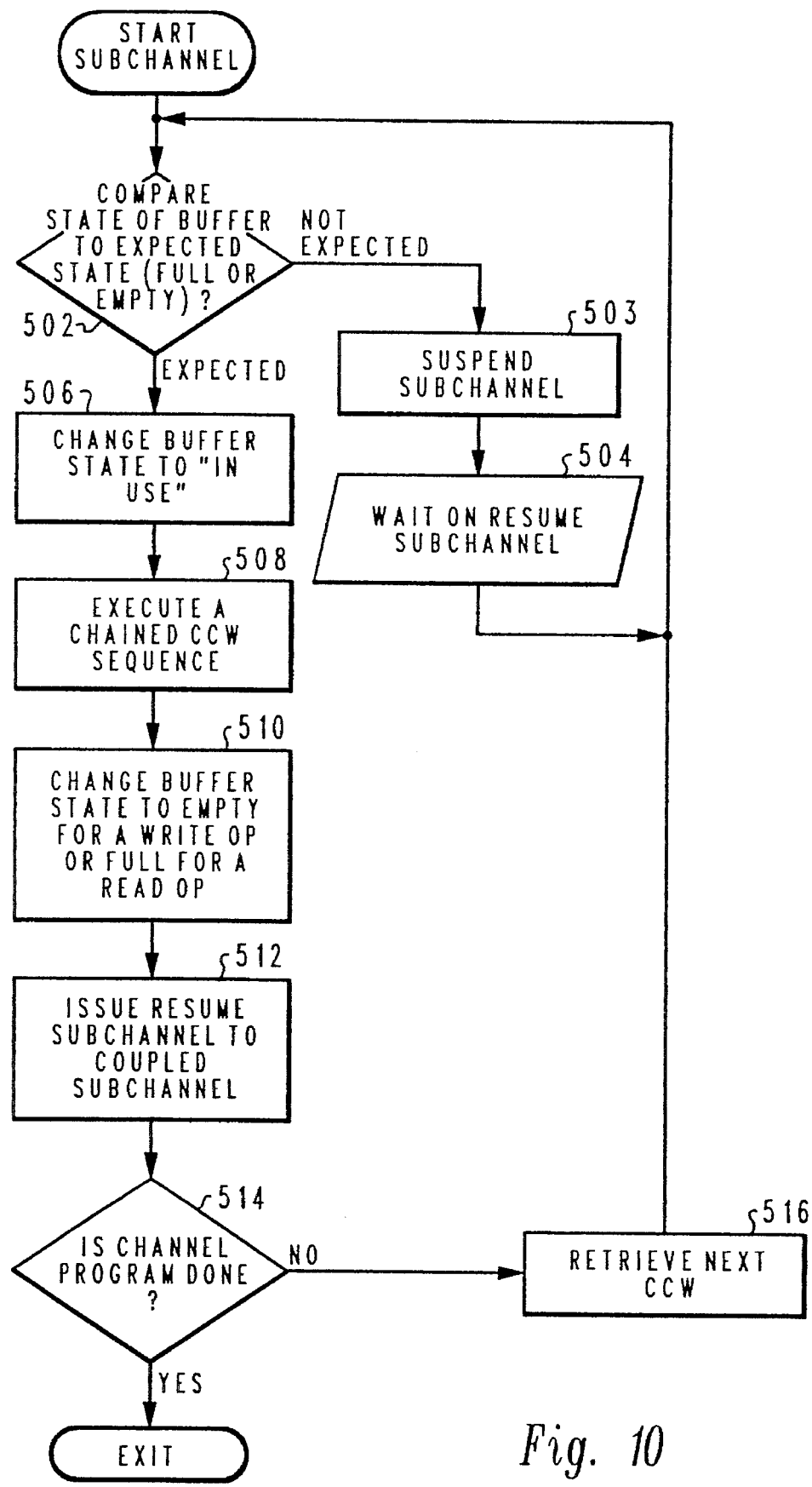
FIG. 10 is a logical flow chart illustrating a coordination process for one embodiment of the present invention where mutual reference between subchannels is used.

FIG. 10 is a flow chart illustrating a process executed in a channel subsystem for either a read channel program or a write channel program. Prior to entering execution of the subchannel programs, a CPU alters the subchannel information blocks to include mutual reference between the subchannels intended to execute the read and write channel programs, respectively. The process is entered upon issuance of a Start Subchannel instruction by a CPU, which has the effect of initializing the buffer state at step 500. At step 502 an operand of the first channel command word is compared to the buffer state to determine if it is of the expected value. For a read program the operand should equal the status indication of an empty state at step 502. Before a write program can continue the buffer must be filled. Initially, a write channel program will not be at the expected "full" state and will be suspended (step 503) to await input at step 504 of a resume subchannel issued from a subchannel executing the read program.

Following the "expected state" branch from step 502, step 506 is executed to change buffer state to "in use." Next, at step 508, one or more channel command words in a sequence are executed to move a record or a portion of a record from an input/output device to a buffer area in main storage (if the channel program is a read). For a write program the direction of movement is from the main storage 12 to an input/output device. At step 510 the status indication for the buffer array is changed to empty or full depending upon whether the program was a write program or a read program, respectively. Next, at step 512 the subchannel issues a resume subchannel to the subchannel referenced in the subchannel information block. Steps 510 and 512 correspond to the Move and Resume Coupled Subchannel operation described above. Next, at step 514 it is determined if the channel program is done. If the channel program has been completed it is exited. If the channel program is not completed, the NO branch is taken to step 516 to retrieve the next CCW. At this point a transfer in channel back to the first channel command word may be done. Alternatively, additional read and write transfer instructions may be executed. For subsequent read or write instructions execution is returned to step 502.

A possible application of the technique of coupling read and write channel programs would be a copy utility. An input subchannel could be for a disk drive and the output subchannel would be for a tape drive. Channel program segments are provided to read disk at a rated maximum device speed. Suspension interruptions may be suppressed in the operation request block so that the only interruptions the program needs to handle are those for a recovery situation such as data checks, or intervention required conditions, or an end of file on reception or transmission of video information.

A more complex utility would be a tape to tape copy function, where the technique is best applied to fixed block size files. If an end of file or incorrect length indication is received on the input channel program, the output channel program must be terminated. This is done by modifying the compare and move or suspend command for the segment associated with the short length buffer to be a control no operation. This is followed by a resume subchannel designating the output subchannel. CPU involvement is then used to build a standard channel program to be used to copy the end of file or short block to the output subchannel.

Coupled Subchannel Rings

The invention may also be applied where data is to be written to a plurality of output devices, for example, in the duplication of distribution tapes. Referring to FIG. 1 let subchannel A be the input (Read) subchannel and subchannels B, C and D be output (Write) subchannels. Subchannel E is used for executing a synchronization channel program, which in itself does not access real I/O devices, but rather serves to coordinate the execution of the other channel programs. Subchannel E utilizes an M by N synchronization array of bytes to ensure the integrity of N buffers used by M output channel programs. Each byte in the synchronization array can be of one or two states: 0, indicating the output channel has not yet processed the buffer and 1 indicating that the output channel program has processed the buffer. When all programs have processed a buffer, the synchronizing channel program changes the state of the buffer from full to empty.

A vector of control bytes for the first (or only) buffer area is also used to prevent a first channel program segment from reexecuting before the synchronizing channel program is able to change the state of the buffer control (as might occur, for example, one other output device is in error recovery for the data in the buffer). Buffer control byte values cycle from empty to in use to full and back to empty. Otherwise a read channel program for subchannel A is similar to the program described with reference to FIG. 10 except that Resumes are issued to the write program from the synchronization program. The synchronization and buffer control arrays are typically initialized by the CPU prior to issuance of the start subchannels.

Figure 11:
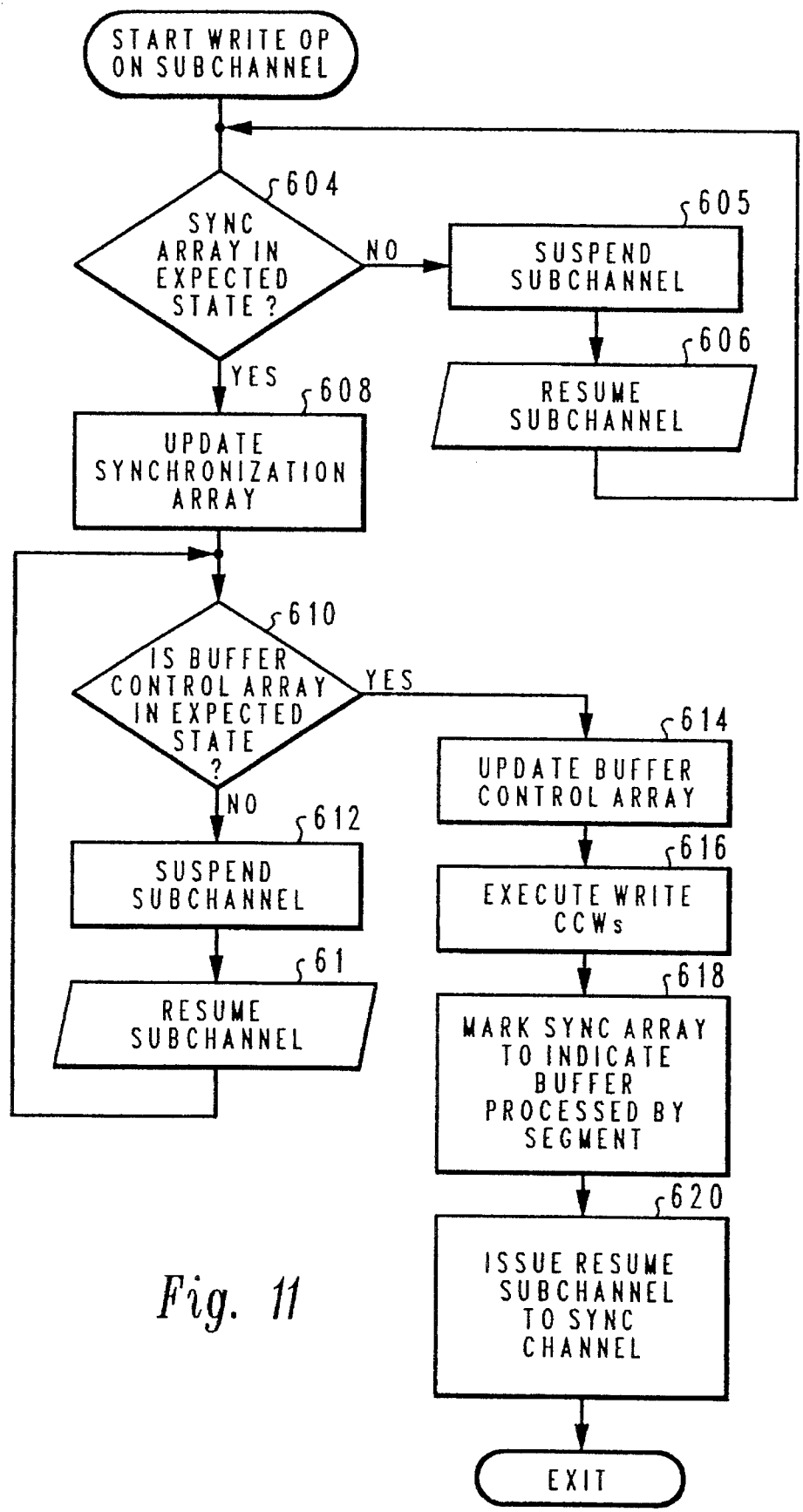
FIG. 11 is a logical flow chart of a write channel program for one embodiment of the invention.

FIG. 11 is a logical flow chart illustrating a write channel program. The process is entered on a start subchannel I/O instruction at step 604, where a compare operation evaluates if the synchronization array is in an expected state. If NO, the channel program is suspended (step 605). The channel program continues at step 606 when the synchronization program resets status and issues a Resume to the suspended subchannel. Processing returns to step 604 and may then pass along the YES branch to step 608 representing updating of the synchronization array. Next step 610 is executed to determine if the buffer control array indicates the buffer is ready to use. If not, the channel program is suspended at step 612 to await a Resume Subchannel at step 613. If the buffer is ready, step 614 is executed to update buffer control array status. Step 616 represents execution of channel command words used for transfer of data from main storage to input/output device. At step 618 the appropriate location of the synchronization buffer is marked to indicate the current segment has processed the buffer array. At step 620 the synchronization subchannel is issued a resume. If processing is complete the process may be exited.

Figure 12:
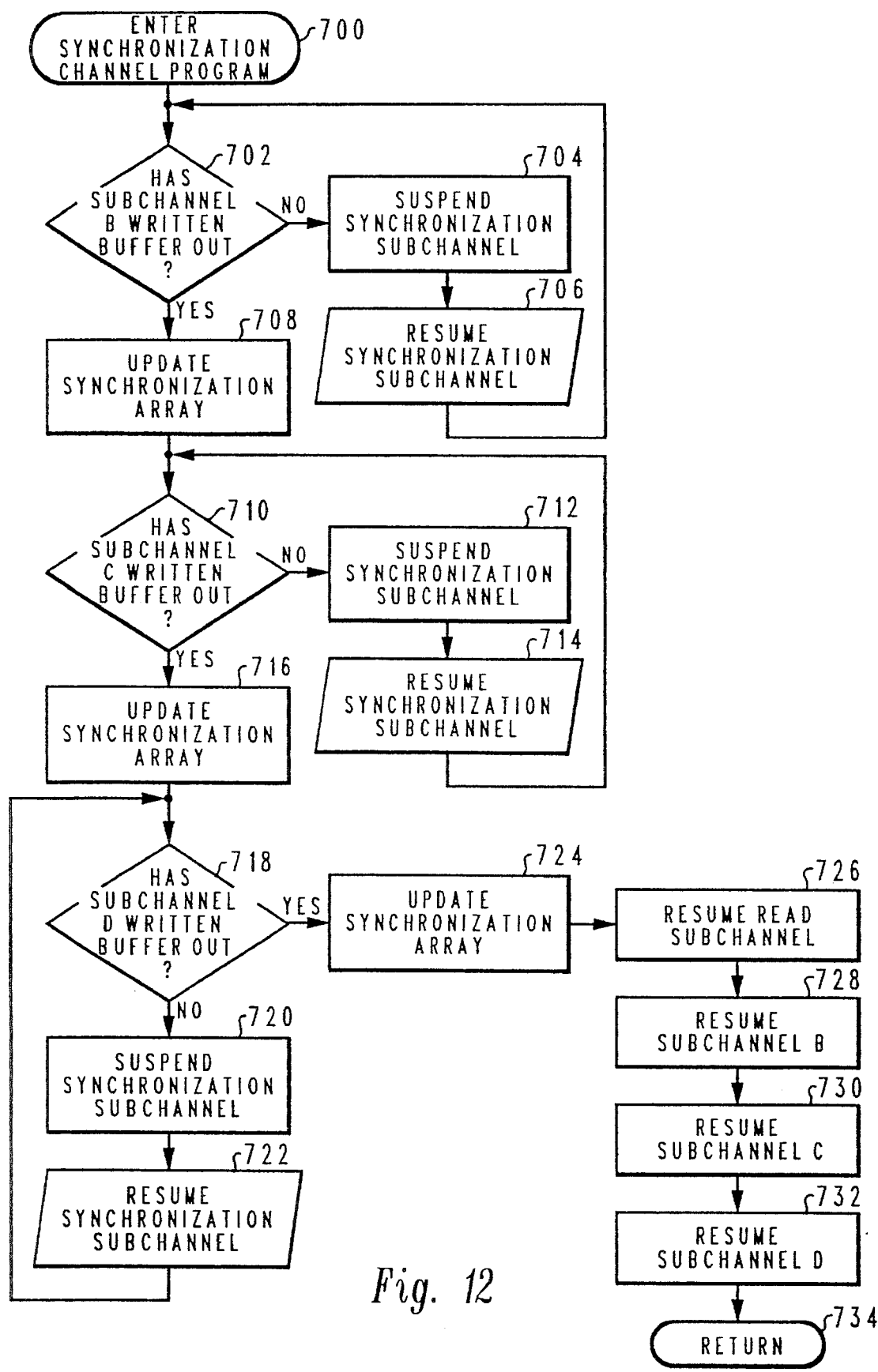
FIG. 12 is a logical flow chart for a synchronization process of one embodiment of the invention.

FIG. 12 illustrates a logical flow chart for a synchronization process used to control several output subchannels writing from the same buffer area(s). Until all output subchannels have finished writing a data block in a buffer area, the input subchannel must be prevented from reusing the area. Preferably, the synchronization process is itself a channel program, executed by a subchannel which is serving as neither an input subchannel or one of the output subchannels utilizing the buffer areas.

The synchronization channel program is entered upon issuance of a Start subchannel instruction with execution of block 700 representing initialization operations. Next block 702 determines if the first write subchannel, subchannel B, has completed writing out the first buffer area. If it has not, the NO branch indicates that the synchronization channel program suspends (step 704) until an asynchronous Resume is received from subchannel B (step 706). Following resumption of execution of the synchronization channel program, or along the YES branch from step 702, step 708 is executed to update the synchronization array to indicate subchannel B has finished with first buffer.

Next, at step 710, it is determined if subchannel C has completed writing out the buffer. If not, step 712 is executed to suspend the synchronization channel program. After receipt of an asynchronous Resume subchannel instruction from subchannel C (step 714), step 710 is reexecuted and the YES branch is taken to step 716 where the synchronization array is updated.

Next, at step 718, it is determined if subchannel D has completed writing out the buffer. If not, step 720 is executed to suspend the synchronization subchannel. After step 722, indicating receipt of an asynchronous Resume instruction from subchannel D, step 718 is repeated to confirm that subchannel D has written out the buffer area in question. Then, following the YES branch, step 724 is executed to update the synchronization array. Steps 702, 710 and 718 represent instances of the CMSus CCW.

With step 726, a Move and Resume coupled segment (MARC) CCW is executed to post to the read subchannel that it may read and to issue to the read subchannel and Resume instruction. Step 728, 730 and 732 reflect posting of Loop synchronized to the write subchannel and issuance of Resume instructions to each. Step 734 is a return indicating that the foregoing routine may be applied to another buffer.

Where a subchannel, e.g. subchannel E, is used for the synchronization function, the subchannel does not need to represent a real device, since its channel program is entirely executed without device activity. A subchannel for a nonexistent device within the addressing range of a real control unit might be chosen for the synchronization function. Or, the channel subsystem might permit the definition of dummy subchannels to be used for synchronization channel programs. The use of dummy subchannels would simplify the processing of halt or clear functions and might be defined to support only the control no-operation, basic sense and sense identification input/output device commands.

Conclusion

The present invention provides for the synchronization of channel programs to be executed by the channel subsystem, with minimal or no intervention by the CPU for a computer system. By using a command architecture, data structures, or both, channel programs determine whether an event has occurred or not. In the case that the event has not occurred, the channel can suspend itself. The channel subsystem also provides mechanisms, which cause the resumption of the suspended channel programs, when specified events occur.

These events include, but are not limited to the readying of a data buffer by one channel program for use by another subchannel.

The present invention provides for conditional execution of a command by a channel subsystem. It provides a new channel command code that causes conditional suspension of a channel program. Count fields of channel command words are used to hold data values to be used by the channel subsystem during execution of that channel command word, permitting the data address field of the channel command word to address a field within an implied length of 1 (or 2). A field is provided in the subchannel information block to identify a coupled subchannel. Finally the definition and use of dummy subchannels to support the synchronization of coupled channel programs is taught.

While the invention is primarily directed to the support of coupled channel programs, it has application to the condition where a program executing on a computer is collecting data and writing the data out on an expedited basis. For example, versions of the Multiple Virtual Storage (MVS) operating system provide a generalized trace facility for generating a record of the sequence of execution of program instructions for diagnostic purposes. A general problem associated with trace facilities is that their execution effects the timing of events on the computer, such as supervisor calls, input/output interruptions, et cetera. Problems occurring during execution of programs have been known to disappear, at the cost of reduced system efficiency, when a tracing program has been introduced to monitor the original program.

The generalized trace facility of the MVS operating system is designed to filter out its own operations from the record it generates. This task is eased if fewer interruptions arise from its own operations. With reduction in the filtering work done by the trace facility, there is less effect on timing of system operation by its use. If channel programs used for input and output of data for the trace facility use the type compare and swap instructions and resume subchannel to maintain execution of a channel program, the trace facility will require no input/output interruptions to empty buffers or to mark it for further use, thus reducing adverse effects of use of the trace facility.

While the invention has been particularly shown and described with reference to a preferred embodiment, it will be understood by those skilled in the art that various changes in form and detail may be made therein without departing from the spirit and scope of the invention.

What is claimed is:

1. A data processing system for coupling execution of channel programs which control data transfer between input/output devices, the data processing system comprising:
   a buffer;
   means for generating a pair of channel programs having a plurality of channel command words with operands;
   channel subsystem means connected to the input/output devices and to the main storage for executing the channel programs to transfer data between input/output devices and the buffer;
   the channel programs having corresponding segments referencing the buffer;
   means for issuing start subchannel instructions to initiate execution of the pair of channel programs;
   means responsive to a write channel command from a channel program becoming current for determining if the buffer has been filled by a read operation from another channel program;
   means responsive to determination that the buffer has not been filled for suspending execution of the channel program having the current write channel command;
   means responsive to filling of the buffer for issuing a resume instruction to a subchannel; and
   wherein the means for suspending execution includes:
     suspend channel command words in a channel program; and
     means for tracking the number of resume commands issued from one channel program less the number of suspend commands encountered for another channel program for indicating if the buffer area is filled.

2. A data processing system as set forth in claim 1, and further comprising:
   means responsive to initiation of execution of the pair of channel programs for filling the buffer and then setting a status indication of full for the buffer.

3. A data processing system as set forth in claim 2, wherein the status indication is in a status block.

4. A data processing system as set forth in claim 1, further comprising:
   means responsive to indication of the buffer being filled for muting the means for suspending execution.

5. A data processing system as set forth in claim 1, and further comprising:
   means responsive to filling the buffer for changing status of the buffer and issuing a resume subchannel instruction to the write channel program identified in a subchannel information block for the read channel program.

6. A data processing system for coupling execution of channel programs which control data transfer between input/output devices, the data processing system comprising:
   a buffer;
   means for generating a pair of channel programs having a plurality of channel command words with operands;
   channel subsystem means connected to the input/output devices and to the main storage for executing the channel programs to transfer data between input/output devices and the buffer;
   the channel programs having corresponding segments referencing the buffer;
   means for issuing start subchannel instructions to initiate execution of the pair of channel programs;
   means responsive to a write channel command from a channel program becoming current for determining if the buffer has been filled by a read operation from another channel program; and
   means responsive to determination that the buffer has not been filled for suspending execution of the channel program having the current write channel command, wherein the means for determining further comprises:
     means for issuing a resume command to a channel program from the remaining channel program; and
     means for tracking the number of resume commands issued less the number of suspending steps encountered by the remaining channel program to determine if execution is to be suspended.

7. A data processing system as set forth in claim 6, wherein the channel command words operative on the buffer for the pair of channel programs are data chained.

8. A data processing system for coupling execution of channel programs which control data transfer between input/output devices, the data processing system comprising:
   a buffer;

means for generating a pair of channel programs having a plurality of channel command words with operands;

channel subsystem means connected to the input/output devices and to the main storage for executing the channel programs to transfer data between input/output devices and the buffer;

the channel programs having corresponding segments referencing the buffer;

means for issuing start subchannel instructions to initiate execution of the pair of channel programs;

means responsive to a write channel command from a channel program becoming current for determining if the buffer has been filled by a read operation from another channel program;

means responsive to determination that the buffer has not been filled for suspending execution of the channel program having the current write channel command;

means for executing a synchronization channel program; and the means responsive to a channel command word in a channel program referencing the buffer becoming current for determining if a corresponding resume has been issued is a status monitoring segment of a synchronization channel program;

the means responsive to determination that the corresponding resume has not been issued for suspending execution of the channel program is a suspend instruction issued from the synchronization channel program; and the means responsive to filling a buffer by execution of channel command word in the read channel program for initiating resumption of execution of the write channel program is a resume subchannel instruction issued by the synchronization channel program.

9. A data processing system for coupling channel programs for input and output operations, substantially without real time central processing unit involvement, comprising:

means for generating a channel program for an input operation on a first subchannel, the channel program having a resume channel command referencing a second subchannel;

means for generating a channel program for an output operation on the second subchannel, the channel program having a suspend channel command;

means for issuing a start instruction to the first subchannel;

means responsive to the start instruction for executing the channel program for the input operation;

means responsive to execution of a resume channel command for beginning execution of the channel program for the output operation;

means for suspending execution of the channel program for the output operation upon encountering the suspend channel command;

the channel program for input operations having a plurality of resume channel commands referencing the second subchannel;

the channel program for the output operation having a suspend channel command corresponding to each resume channel command referencing the second subchannel; and the means for suspending the channel program for the output operation being responsive encountering a suspend channel command only if the resume channel command corresponding to the suspend channel command has not been executed.

10. A data processing system as set forth in claim 9, and further comprising:

means for tracking whether a resume channel command corresponding to a suspend channel command has been executed by offsetting a count of resume channel commands encountered with suspend channel commands as encountered.

11. A data processing system as set forth in claim 9, and further comprising:

means for using data chaining in channel commands of the channel programs for the input and output operations.

12. A data processing system comprising:

a main storage;

means for generating channel programs having a plurality of channel command words with operands;

a plurality of input/output devices;

a channel subsystem connected to the plurality of input/output devices having a plurality of subchannels for executing the channel programs to transfer data between input/output devices and a buffer area in the main storage;

bus means for carrying data and instructions between the central processing unit, the main storage and the channel subsystem;

means for inserting channel command word operands into the main storage; and means for performing comparisons between the channel command word operands in the main storage and other channel command word operands;

a status indication in the main storage for each buffer area indicating the buffer area as empty, as full, or as in use; and the means for performing comparisons including an operation command in the channel programs for comparing a channel command word operand to the status indication, wherein the means for performing the comparisons is positioned at the beginning of a segment of the channel program and further includes means responsive to a negative outcome of the comparison for suspending execution of the channel program;

means for identifying a reference subchannel in a subchannel information block for a first subchannel; and means for issuing a resume subchannel instruction to the reference subchannel identified in the subchannel information block, wherein the means for inserting designated channel command word operands into selected locations of the main storage further comprise:

concluding operation means for a segment for placing the operand into the status indication of a buffer area.

13. A data processing system as set forth in claim 12, wherein channel programs include read channel programs and write channel programs, with the write channel programs being suspended with the comparison step when the buffer status is empty and the read channel programs are suspended when the buffer status is full.

14. A data processing system as set forth in claim 13, and further comprising:

means for generating subchannel information blocks containing identification of a reference subchannel; and means for issuing resume subchannel instructions to a reference subchannel.

15. A data processing system as set forth in claim 14, wherein a read channel program and a write channel program are coupled by mutual reference of the respective subchannels on which the programs execute through respective subchannel information blocks.

16. A data processing system as set forth in claim 14, and further comprising:

a chain of references among a plurality of subchannels through a subchannel information block for each subchannel.

17. A data processing system as set forth in claim 16 and further comprising:

at least a first input channel program for a subchannel designated for an input/output device for transferring a record from the input device into the main storage;

a plurality of output channel programs for subchannels designated for output devices for transferring the record out of the main storage into the input/output devices;

means for generating a synchronization array in the main storage indicating use or absence of use of a buffer area by each of the output channel programs; and means for executing a channel program on a subchannel for preserving the contents of the buffer area until all output channel programs have been executed and for resetting values in the synchronization array from operands in channel command words in the channel program.

18. A method of coupling execution of channel programs on subchannels for a data processing system, the method comprising the steps of:

generating a plurality of channel programs for execution by a plurality of subchannels, each of the channel programs having at least a first command for conditional suspension or resumption;

issuing a start channel instruction to initiate execution of the channel programs by the subchannels;

responsive to a command for conditional suspension, suspending a target channel program containing the command for conditional suspension if no corresponding command for resumption has been received; and responsive to a resume channel instruction sent to the target subchannel from a first subchannel, resuming execution of the target subchannel;

defining a buffer area within the main storage for data being transferred between input/output devices;

indicating status for the buffer area through the main storage as empty, full, or in use;

including compare operations in the channel programs for comparison of an operand against the buffer area status;

conditionally suspending a channel program subject to the result of the step of comparing;

prior to or contemporaneous with the step of resuming, changing the buffer area status;

executing within a segment of a channel program at least a first channel command word for an input or output operation;

referencing a subchannel in a subchannel information block for the first subchannel;

issuing a resume channel instruction to the referenced subchannel from the first subchannel, wherein channel programs include read channel programs and write channel programs, with the write channel programs being suspended with the comparison step when the buffer status is empty and the read channel programs being suspended when the buffer status is full.

19. A method as set forth in claim 18, wherein the channel programs each include a plurality of segments beginning with compare operations and concluding with a change of status for the buffer area and issuance of a resume instruction.

20. A method as set forth in claim 19, wherein a read channel program and a write channel program are coupled by identifying the respective subchannels on which the programs are executed to one another through the respective subchannel information blocks.

21. A method as set forth in claim 18, and further comprising:

issuing a resume channel instruction to a subchannel specified in an operand for a command for resumption upon processing by the first subchannel.

22. A method as set forth in claim 18, wherein the step of identifying further comprises:

referencing a coupled subchannel for each of a plurality subchannels through a subchannel information block for each subchannel.

23. A method as set forth in claim 22, wherein a group of subchannels are logically grouped by mutual reference through the subchannel information blocks.

24. A method as set forth in claim 18, wherein the step of generating the channel programs further comprises:

segmenting each channel program by beginning each segment with a compare and move or suspend operation providing comparison of a value in an operand for the operation with the status of a buffer array and suspending the channel program or continuing execution of the channel program depending upon the outcome of the comparison; and concluding each segment with a move and resume coupled subchannel operation providing issuance of a resume subchannel instruction to a target subchannel.

25. A method as set forth in claim 24, and further comprising:

providing at least a first input channel program for a subchannel designated for an input device;

providing a plurality of output channel programs for subchannels designated for output devices;

storing a synchronization array in the main storage indicating use or absence of use of a buffer area by each of the output channel programs; and providing a synchronization channel program for a subchannel for preserving the contents of the buffer area until all output channel programs have been executed and for resetting values in the synchronization array from operands in channel command words in the synchronization channel program.

26. A method of coupling execution of channel programs for controlling data transfer between input/output devices through a main storage of a data processing system, wherein an input or an output operation between the main storage and an input/output device is controlled by executing a channel program, the method comprising the steps of:

generating a pair of channel programs for execution on a channel subsystem for controlling transfer of data to and from the main storage, each of the channel programs having corresponding segments referencing a buffer within the main storage;

issuing a start channel instruction to initiate execution of the channel programs;

filling the buffer upon execution of read channel command word in a channel program;

responsive to a write channel command word referencing the buffer becoming current, determining if the buffer has been filled;

if the buffer has not been filled, suspending execution of the channel program in which the write channel command occurred;

issuing a resume command to a channel program from the remaining channel program; and tracking the number of resume commands issued less the number of suspending steps encountered by the remaining channel program to determine if execution is to be suspended.

27. A method as set forth in claim 26, wherein the step of determining further comprises:

referencing a buffer status indication to determine if the buffer has been filled.

28. A method as set forth in claim 27, and further comprising:

after initiating execution of the channel programs, writing to a buffer and then setting a status indication of full for the buffer.

29. A method as set forth in claim 28, wherein the status indication is in a status block.

30. A method as set forth in claim 28, wherein the status indication is in an indirect data address word for the buffer, the channel command words of the channel programs being data chained.

31. A method as set forth in claim 26, and further comprising:

data chaining the channel command words within the channel programs upon generation of the channel programs.

32. A method as set forth in claim 31, wherein the step of data chaining includes:

inserting resume and suspend channel command words within the chained data.

33. A method as set forth in claim 26, wherein a channel program may include both read and write channel commands.

34. A method for coupling channel programs for input and output operations substantially without real time central processing unit involvement, the method comprising the steps of:

generating for a first subchannel a first channel program having a resume channel command referencing a second subchannel;

generating for the second subchannel a second channel program having a suspend channel command;

issuing a start instruction to the first and second subchannels;

responsive to the start instruction, beginning execution of the first and second channel programs;

suspending execution of the second channel program upon encountering the suspend channel command;

responsive to the execution of the resume channel command, issuing a resume instruction to the second subchannel from the first subchannel causing the second channel program to resume execution;

the first channel program having a plurality of resume channel commands referencing the second subchannel;

the second channel program having a suspend channel command corresponding to each resume channel command referencing the second subchannel in the first channel program; and the step of suspending the second channel program upon encountering a suspend channel command being effective only if the resume channel command corresponding to the suspend channel command has not been executed.

35. A method as set forth in claim 34, and further comprising:

determining whether a corresponding resume channel command for a suspend channel command has been executed by tracking the number of resume channel commands executed less the suspend channel commands executed.

36. A method as set forth in claim 34, and further comprising:

using data chaining in channel commands of the channel programs for the input and output operations.

\* \* \* \* \*